Nov. 23, 1948.  G. CHALICARNE  2,454,593
PNEUMATIC CHUCK

Filed Aug. 9, 1945  2 Sheets-Sheet 1

Inventor
G. Chalicarne
By Glascock Downing Seebra
Attys.

Nov. 23, 1948.   G. CHALICARNE   2,454,593
PNEUMATIC CHUCK

Filed Aug. 9, 1945   2 Sheets-Sheet 2

Inventor
G. Chalicarne

Patented Nov. 23, 1948

2,454,593

UNITED STATES PATENT OFFICE 2,454,593

PNEUMATIC CHUCK

Gabriel Chalicarne, Meudon, France, assignor to Societe Anonyme: Forges & Ateliers De Meudon, Meudon, France Application August 9, 1945, Serial No. 609,863
In France February 21, 1941

Section 1, Public Law 690, August 8, 1946
Patent expires February 21, 1961

7 Claims. (Cl. 279—116)

The present invention has for object a concentrical clamping chuck for machine-tools and more particularly for lathes in which the clamping stress is produced by a driving fluid, and occasionally by hand.

Although the apparatus is called a "pneumatic chuck" because it is compressed air which is the most often used as driving fluid in the applications of this kind, the invention is not limited, as will be explained hereinafter, to the use of compressed air.

Ordinary concentrical clamping chucks are known in which the jaws have, on the inner face of the chuck, grooves which mesh with spiral-shaped grooves formed in a plate housed in the body of the chuck. By causing said plate to rotate in the chuck by means of a small bevel gear which can receive a hand key, the simultaneous and concentrical movement of the jaws is determined.

The subject-matter of the invention is a hand chuck of this type, in which the small bevel gear is controlled by one or more engines housed in the body of the chuck.

The accompanying drawing illustrates an embodiment demonstrating the invention.

Fig. 1 illustrates a fixed head stock 1 in which rotates the spindle 2 the ends of which, shown in section, can be seen at the left and at the right; 3 is an ordinary face plate screwed on the nose of the spindle 2 and 4 is the body of the chuck.

Figure 1:
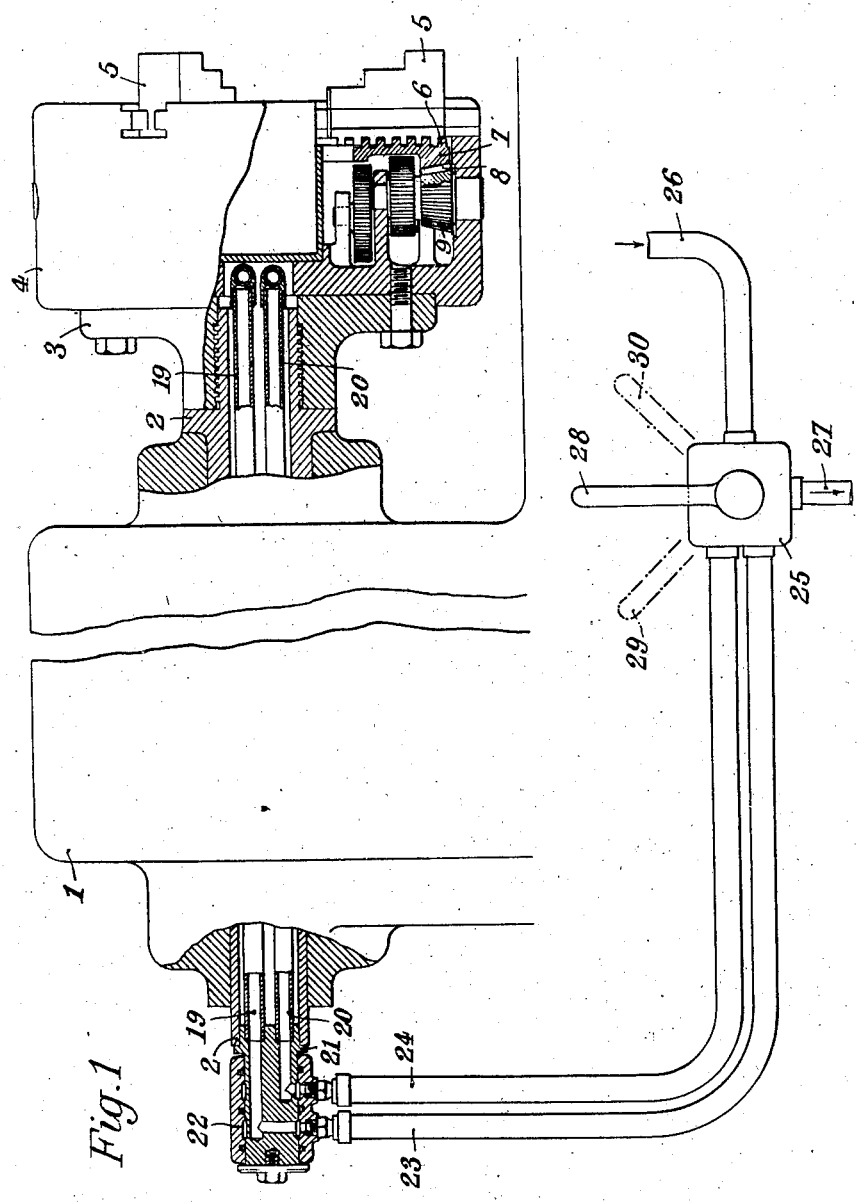
Figure 2:
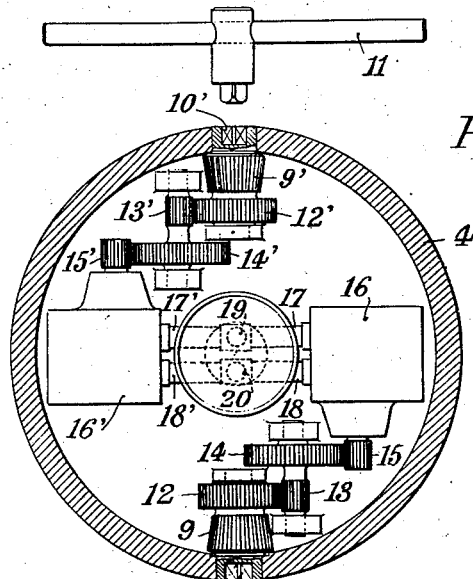
Fig. 2 illustrates a section of the chuck at right angles to its axis.

The jaws 5 (Fig. 1) which slide in mortises formed in the body of the chuck are provided, on the inner face relatively to the chuck, with grooves which mesh with the spiral grooves 6 of the plate 7, the whole structure as in an ordinary chuck. The plate 7 is cut, on the side opposed to the spiral, in the form of a bevel gear which meshes at 8 with the bevel pinion 9.

Said pinion can be caused to rotate, either by means of a detachable key 11, which is engaged in a recess 10 formed in the pinion 9, which recess is square, hexagonal or of any other shape corresponding to that of the key 11, or by gears such as 12, 13, 14, 15 which, in their turn can transmit the stress of an engine 16.

In order that the weights inside the chuck should be balanced and, also in order that the stresses created on the spiral plate 7 should not have an important reaction on the centering of plate 7, two engines 16 and 16', two sets of gears and two pinions 9 and 9' are preferably arranged, simultaneously controlling plate 7.

If the dimensions of the chuck allow so, more than two engines with their respective sets of gears can also be used.

The engines 16 and 16' are reversible and are housed in the body of the chuck 4.

By means of pipes 17 and 17' they are connected to the longitudinal pipe 19 and by means of pipes 18 and 18' they are connected to the longitudinal pipe 20. The longitudinal pipes 19 and 20 pass through the interior of the spindle 2 of the lathe or machine-tool, and are connected, on the other side of the stock 1, to a member 21 secured to the end of the spindle and rotating therewith. A box 22, which does not rotate, carries fixed pipes 23 and 24 and linings, stuffing-boxes or any other device, ensuring at the same time the fluid-tightness of the system and respectively putting pipe 23 in communication with pipe 19 and pipe 24 with pipe 20, whatever may be the position of the spindle 2.

The pipes 23 and 24 are respectively connected to a valve box or cock 25, connected in its turn to a source of driving fluid 26 and to an exhaust orifice 27.

Said cock or valve box 25 is so devised that, by the operation of a lever 28, it is possible to put pipes 23 and 24 in communication either with the driving fluid inlet 26, or with the exhaust 27.

By pushing for instance the lever 28 towards the left at 29, pipe 23 will be put in communication with pipe 26 and pipe 24 with the exhaust 27. On the contrary, by pushing the lever towards the position 30, pipe 24 will be put in communication with the inlet 26 and pipe 23 with the exhaust 27. At dead center 28, there is no communication with the inlet 26. The internal arrangements of the cock 25 do not form part of the invention; it suffices that it should satisfy the above conditions.

The operation is as follows:

When the lever 28 is pushed to 29, the driving fluid admitted at 26 enters through cock 25 into pipe 23, then through the box 22 into pipe 19 and reaches, through conduits 17 and 17', the engines 16 and 16'. Through the medium of the gears 15—14—13—12—9, on the one hand, and 15'—14'—13'—12'—9', on the other hand, the engines act on the set of teeth 8 of plate 7, to cause it to rotate. It is to be understood that the directions of rotation of the engines 16 and 16' are such that they act simultaneously in the same direction on plate 7. The plate 7, through the medium of the spiral grooves 6 will cause the jaws 5 to move simultaneously in one direction or in the other, according to the direction of rotation of the engines 16 and 16' and the direction in which the spiral is wound.

When the jaws 5 have come into contact with the member to be clamped, the movement stops and the engines 16 and 16' cease to rotate. At this moment, the spiral being irreversible, as in an ordinary hand controlled chuck, the admission of the driving fluid can be stopped by bringing lever 29 to dead center 28, without the member being unclamped.

During all the time the engine operates, the exhaust pipes 18 and 18' of the engines have been in communication through 20, 24, and cock 25 with the exhaust 27. If now, the lever 28 is pushed into position 30, the direction of the admissions and exhausts of the engines 16 and 16' is reversed. The fluid is admitted into the engines through pipes 24, 20 and 18 and 18' and escapes therefrom through 17, 17', 19 and 23 through 27.

The direction of rotation of the engines being reversed, plate 7 rotates in the reverse direction and the jaws move in the other direction, unclamping the clamped member.

The engines 16 and 16' will be so chosen that their torque should be constant during an entire revolution of their shaft, so that, when they stop, when the member is clamped, the same value of the clamping torque will be obtained whatever may be the position in which the driving shaft stops. Moreover, it is necessary that said engines should be reversible, that is to say that they should exert exactly the same clamping torque in one direction of rotation as in the other. But, with the exception of these two conditions, the engines can be of any type whatever. It is to be understood that they can even be actuated by any driving fluid other than compressed air; for instance by steam or by a liquid under pressure; the explanations given above would not be changed thereby. The engines 16 and 16' can even be electric motors. In this case, pipes 17, 17', 18, 18', 19, 20 will be replaced by suitable electric wires and box 22 by rotating contacts. The cock 25 will be replaced by a suitable multiple switch such as those which already exist for remote controls. But the other internal details of the chuck will be the same.

However, compressed air being preferably employed, the compressed air engine of the so-called "gear" type which allows of obtaining a constant torque without dead center and which is totally reversible, will be more suitable than a piston engine.

When the engine stops, when the jaws come in contact with the member, the pressure of the fluid in the engine must be such that the clamping reaches the desired value. If a tighter clamping of the jaws on the member is desired, it will be necessary to use a high pressure for the driving fluid admitted through 26, and if, on the contrary, a looser clamping is desired, use will be made of less pressure. For that purpose, on the supply conduit 26 is arranged an apparatus for adjusting the pressure. Said apparatus, not shown in the drawing, will be provided with a pressure-gauge so that the operator should always know the pressure of the fluid admitted at 26 and consequently the clamping power of the chuck.

The clamping power of the chuck will be only slightly affected by the internal dimensions of the conduits 17 and 17', 18 and 18', 19, 20, 23, 24, 26 and 27 as well when said conduit serves for admitting as for the exhaust of the driving fluid. It is necessary that the speed of the jaws, when they move, should be somewhat slow, so that there should not be a violent shock of the jaws on the member to be clamped at the time of contact. The internal dimensions of the conduits 17 and 17', 18 and 18', 19, 20, 23, 24, 26, 27 will be judiciously chosen, on the one hand, to allow the exhaust of the unavoidable leakages without appreciable counter-pressure, when the engine is stopped under pressure, on the other hand, for limiting the speed of the engines when the latter rotate during the approaching or adjusting stroke of the jaws.

It will be seen by the foregoing that the jaws 5 can, if desired, be actuated by the engines when the chuck rotates. It will also be seen that, if the cock 25 is held open long enough, the jaws can pass over all the space allowed by the guiding grooves. It results therefrom that the chuck is, at every instant, ready to clamp a member whatever may be the diameter of the latter, without it being necessary to change the jaws.

It will also be seen that the pressure of the fluid can be maintained in the engines during the operation of the machine-tool or it can be eliminated by bringing back the lever 28 to dead center, since the clamping system of the jaws is irreversible as in a hand chuck. Whether the pressure be maintained or not, no accidental unclamping can occur during the work even if the pressure fails in the inlet conduit 26.

During the working stroke of the machine-tool and without stopping its rotation, the clamping force of the jaws can be also increased by increasing the pressure at 26 and by actuating the lever 28 in the direction for clamping. But the clamping initially applied cannot be diminished.

The only false operation possible would consist in pushing the lever 28 into unclamping position during the operation of the machine. For avoiding this risk, the lever 28 is provided with a stop catch holding it in the position 28, and even with springs automatically restoring it to said position when it is released.

As explained above the pinion 9 can be actuated by hand by the key 11 when driving fluid is not available, or when the latter accidentally fails. One is then assured that the machine-tool cannot get out of working order owing to failure of the driving fluid.

Figure 3:
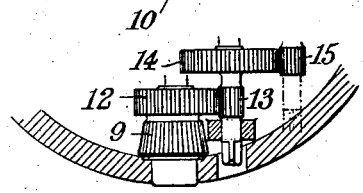
Fig. 3 is a detail of the jaw actuating mechanism.

Fig. 3 illustrates a modification of the hand control: the latter is effected by means of pinion 13 and not by means of pinion 9. In this case, the stress to be exerted by the hand key 11' will be less since there is a gearing-down by means of the gears between the axis of pinion 9 and that of pinion 13. Thus the hand control can also be effected on the axis of pinion 9.

Figure 4:
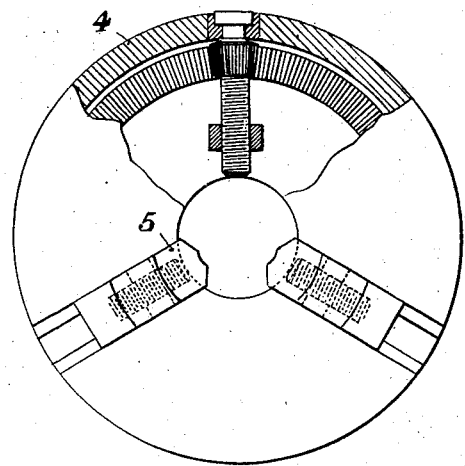
Fig. 4 is a front view of the chuck, partly broken away.
Figure 5:
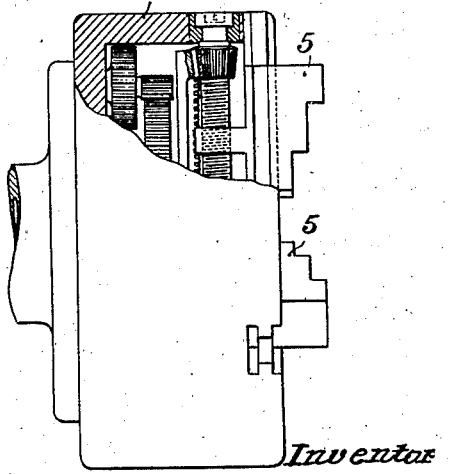
Fig. 5 is a side view, partly broken away.

The invention is not limited to the chuck systems the jaws of which mesh with a plate cut in spiral shape. The jaws can be controlled by any other means: for instance, by screws, as illustrated in Figs. 4 and 5 in side view, section and elevation, it being understood that the internal engines are then arranged to act on said screws as would be done by the hand operated key of the hand chuck.

Another advantage of the invention arises from the fact that the box 22 is not cumbersome and can be easily housed on most machine-tools. The member 21, which supports it, being, in reality, an accessory, there is no need to provide for the same an accurate and rugged connection with the spindle 2, and it can therefore be easily fitted on the spindle 2 of any machine-tool whatever, even, the most often, without it being necessary to dismantle the spindle 2 to subject it to a machining operation for its adaptation.

I claim:

1. In a chuck for machine-tools, the combination of a chuck body, jaws in said chuck body, means for radially guiding said jaws, means for actuating said jaws simultaneously and concentrically relatively to the axis of said chuck body, at least one fluid-operated rotary engine housed in the chuck body and secured directly thereto, producing rotary moments, and revolving means driven by said rotary moments and actuating said means for actuating said jaws.

2. In a chuck for machine-tools, the combination of a chuck body, radial guiding grooves formed in said chuck body, jaws housed in said radial grooves, and in the rear face of which teeth are provided, a circular plate concentric with the axis of said chuck body and rotatively mounted within said chuck body, and on one face of which are formed spiral grooves arranged to come in engagement with the teeth of said jaws and on the other face of which are provided peripheral bevel pinion teeth, toothed bevel pinions having radial axes peripherally and rotatively mounted in said chuck body and constantly in mesh with the teeth of said plate, a distinct rotary engine for each of said toothed bevel pinions and means for coupling each engine housed in the chuck body and secured directly thereto to one of said toothed bevel pinions.

3. In a chuck for machine-tools, the combination of a chuck body, radial guiding grooves formed in said chuck body, jaws housed in said radial grooves, and in the rear face of which teeth are provided, a circular plate concentric with the axis of said chuck body and rotatively mounted within said chuck body, and on one face of which are formed spiral grooves arranged to come in engagement with the teeth of said jaws and on the other face of which are provided peripheral bevel pinion teeth, toothed bevel pinions having radial axes peripherally and rotatively mounted in said chuck body and constantly in mesh with the teeth of said plate, a distinct rotary engine for each of said toothed bevel pinions and a gearing-down device for coupling each engine housed in the chuck body and secured directly thereto to one of said toothed bevel pinions.

4. In a chuck for machine-tools, the combination of a chuck body, radial guiding grooves formed in said chuck body, jaws housed in said radial grooves, and in the rear face of which teeth are provided, a circular plate concentric with the axis of said chuck body and rotatively mounted within said chuck body, and on one face of which are formed spiral grooves arranged to come in engagement with the teeth of said jaws and on the other face of which are provided peripheral bevel pinion teeth, toothed bevel pinions having radial axes peripherally and rotatively mounted in said chuck body and constantly in mesh with the teeth of said plate, a distinct rotary engine for each of said toothed bevel pinions, a gearing-down device having gears for coupling each engine housed in the chuck body and secured directly thereto to one of said toothed bevel pinions, means on certain gears of said gearing-down device for allowing them to be rotated by means of a key from the outside of said chuck body.

5. In a chuck for machine-tools, the combination of chuck body, radial guiding grooves formed in said chuck body, jaws housed in said radial grooves, a screw-threaded nut on the rear face of each of said jaws and rigid with said jaw, a circular plate concentric with the axis of said chuck body and rotatively mounted within said chuck body and on one face of which are provided peripheral bevel pinion teeth, toothed bevel pinions having radial axes peripherally and rotatively mounted in said chuck body and in mesh with the teeth of said plate, a radial screw-threaded rod rigid with each of said toothed bevel pinions and screwed in one of said screw-threaded nuts, peripheral bevel pinion teeth on the other face of said circular plate, toothed bevel pinions having radial axes peripherally and rotatively mounted in said chuck body and constantly in mesh with said teeth of said plate, a distinct rotary engine for each of said toothed pinions, housed in the chuck body and secured directly thereto and means for coupling each engine to one of said toothed pinions.

6. In a chuck for machine-tools, the combination of a chuck body, radial guiding grooves formed in said chuck body, jaws housed in said radial grooves, means for actuating said jaws simultaneously and concentrically relatively to the axis of said chuck body, at least one fluid-operated rotary engine to drive said means for actuating said jaws, housed in the chuck body and secured directly thereto, a conduit for admitting the driving fluid common to all the engines, an exhaust conduit common to all the engines, a source of driving fluid, an exhaust pipe and means placed outside said chuck for putting said admission and exhaust conduits alternately in communication with said source of driving fluid and with said exhaust pipe.

7. In a chuck for machine-tools, the combination of a chuck body, radial guiding grooves formed in said chuck body, jaws housed in said radial grooves, means for actuating said jaws simultaneously and concentrically relatively to the axis of said chuck body, at least one fluid-operated rotary engine to drive said means for actuating said jaws, housed in the chuck body and secured directly thereto, said engines being of the reversible type and of constant torque all over one revolution of the engine.

GABRIEL CHALICARNE.

REFERENCES CITED

The following references are of record in the file of this patent:

UNITED STATES PATENTS

| Number | Name | Date |
|---|---|---|
| 1,534,572 | Cutler | Apr. 21, 1925 |
| 2,183,369 | Schurr | Dec. 12, 1939 |
| 2,188,095 | Hartsuff | Jan. 23, 1940 |
| 2,250,068 | McKay et al | July 22, 1941 |
| 2,323,091 | Johnson et al | June 29, 1943 |

FOREIGN PATENTS

| Number | Country | Date |
|---|---|---|
| 693,132 | Germany | June 6, 1940 |